(12) United States Patent
Ding

(10) Patent No.: US 11,961,098 B2
(45) Date of Patent: Apr. 16, 2024

(54) METHODS AND SYSTEMS FOR EVALUATING, REWARDING AND FACILITATING PHILANTHROPIC WORKS

(71) Applicant: Jiali Ding, Beijing (CN)

(72) Inventor: Jiali Ding, Beijing (CN)

(73) Assignee: Jiali Ding, San Francisco, CA (US)

( * ) Notice: Subject to any disclaimer, the term of this patent is extended or adjusted under 35 U.S.C. 154(b) by 190 days.

(21) Appl. No.: 17/527,122

(22) Filed: Nov. 15, 2021

(65) Prior Publication Data

US 2022/0148011 A1 May 12, 2022

Related U.S. Application Data

(63) Continuation of application No. 17/093,566, filed on Nov. 9, 2020, now Pat. No. 11,222,345.

(51) Int. Cl.
*G06Q 30/02* (2023.01)
*G06Q 20/10* (2012.01)
*G06Q 20/40* (2012.01)
*G06Q 40/02* (2023.01)

(52) U.S. Cl.
CPC ............ *G06Q 30/02* (2013.01); *G06Q 20/10* (2013.01); *G06Q 20/40* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2007/0250370 A1* | 10/2007 | Partridge | G06Q 10/109 705/7.14 |
| 2012/0253901 A1* | 10/2012 | Montgomery | G06Q 30/0241 705/14.5 |
| 2013/0218660 A1* | 8/2013 | Fargo | G06Q 30/0239 705/14.39 |
| 2014/0047004 A1* | 2/2014 | Anglin | G06Q 10/10 709/203 |

FOREIGN PATENT DOCUMENTS

WO WO-2008014418 A2 * 1/2008 ............. G06Q 10/10

OTHER PUBLICATIONS

Zeloes, Volunteer Rewards Program: Say 'Thank You' With Points and Perks, retrieved from https://getzelos.com/volunteer-rewards-program/ (Year: 2020).*

* cited by examiner

*Primary Examiner* — Gregory S Cunningham, II

(57) ABSTRACT

Method and system for evaluating, rewarding and facilitating philanthropic works are described. Ethical accounts and points are introduced and computer-implemented fair evaluations of, and hence interchangeable rewards for, various philanthropic works that reflect different time values are provided. Automatic calculation and distribution of rewarding points from a beneficiary to not only its benefactor but also the benefactor' precious benefactors are implemented to encourage sustainable philanthropy over time. Rewarding amounts and paths are tracked explicitly for impact measurement of philanthropic works, which may be used to facilitate more effective allocation of philanthropic resources. Volunteer requesting, applying and rewarding at the level of minimum durations are enabled, and automated coordination and documentation are offered to further facilitate philanthropic endeavors.

20 Claims, 15 Drawing Sheets

First receiver A:
   $2^{nd}$: B, C     5 points each
   $3^{rd}$: D, E, G   0.33 points each
   $4^{th}$: F         0.1 points First receiver H:
   $2^{nd}$: C        10 points
   $3^{rd}$: G        1 points

FIG. 2A                 FIG. 2B

501 — [EthiPoint | Good Work ▾ | People&Organizations ▾ | Volunteering ▾ | Donation ▾ | Accounts&Profile ▾ | FAQ | Hello lu1 ▾]

Good Work Post

505 Title: Alumni helped at BigUniversity's new student move-in day

510 Work type: Organization donated service via volunteers.

515 Work role: Community and Social Service: Alumni Service and Other Social Worker 520 For cause: Education Programs, Alma Mater Support, Scholarship and Financial Aid 525 Work time and location: From Sept. 19, 2020, 8 a.m. till Sept. 26, 2020, noon at 123 Fulton St, San Francisco, CA 19958.

Work benefactors' contribution: BigUniversity 6.00 Hour and ( 3 volunteers )  — 532

530 { lauraintial 4.00 Hour
     Djwh 2.00 Hour        } 534
     gcy 4.00 Hour }

540 Work description. This good work is finished via volunteers who helped with need. Volunteer at BigUniversity's New Student Move-in Day   545

550 [image]

555 Published Sept. 28, 2020, 12:04 p.m. by BigUniversity.

560 [ACKNOWLEDGE THIS GOOD WORK]     570 [SHARE THIS GOOD WORK POST]

580 0 comments:

There is no comment yet.

Add a New Comment

Comment content: I appreciated this good work and transferred EP to express my gratitude!

[ADD COMMENT] 590

FIG. 5

Acknowledge Benefactors/Volunteers for Alumni helped at BigUniversity's new student move-in day You can use the following form to acknowledge (i.e., reward) the benefactor or volunteers listed as "EP Receiver" for their good work, by filling in their "Work contribution" and your "Rewarding amount" of ethical points (i.e. EPs) to be transferred to them, and clicking the "Transfer EP" button. A portion of the "Rewarding amount" will be automatically distributed to their previous benefactors if there is any. A fine, it shown is column "Transferred", indicates the last time when you transferred EPs to them for this good work.

Note: The default value of "Work contribution" is the total amount of money (in USD) or time (in Hour) that a benefactor or volunteer has contributed in this good work. You may change that default value and input an amount of their contribution that benefited you, which could be 0. The default value of "Rewarding amount" equals to the total monetary contribution (in EM), or is the adjusted total time contribution (in EH) that reflects different time values for different good works (e.g., one hour of pro bono legal services may correspondents to more than one points in fines). You may change most default value and input another amount that you deem appropriate for rewarding them, you deem appropriate for rewarding them, which could be 0. For A non-zero "Rewarding amount" for a zero "Work contribution" is invalid. However, a zero "Rewarding amount" for a non-zero "Work contribution" is valid, for instance, when you have rewarded them for this good work before.

| EP Receiver | Work contribution | Work unit | Rewarding amount | Rewarding unit | Description | Transferred |
|---|---|---|---|---|---|---|
| BigUniversity | 6.00 | Hour | 16.42 | EH | for biguniversity-alumni-helps | |
| lauraintial | 4.00 | Hour | 10.95 | EH | for biguniversity-alumni-helps | |
| Dinh | 2.00 | Hour | 5.47 | EH | for biguniversity-alumni-helps | |
| dry | 4.00 | Hour | 10.95 | EH | for biguniversity-alumni-helps | |

FIG. 6 jfm

Example nonprofits 1 follower

FOLLOW

EP accounts:

| Account | Balance | Unit |
|---------|---------|------|
| EPMONEY | 23.16 | EM |
| EPTIME | -6.63 | EH |

Acknowledged 4.51EM, 37.52EH to
3 benefactors

Acknowledged 27.03EM, 32.41EH by
3 beneficiaries

Acknowledged 1.13EM, 0.96EH by
6 2deg beneficiaries

Donate to this user:

Amount in USD:
5.00

Anonymous:
Check to make this donation invisible to others

ADD TO GIVING CART

Basic information:

Organization name: JFM

EIN: 01-1234567

Organization sector: Non-profit organization

Organization mission: To advocate cat Rights, Welfare, and Services

Eligible to receive tax_deductible contributions: YES

Representative: John Arbuck

Address: 425 1st Str, San Francisco, CA, 94105, USA

Phone number: 4055353223

Summary:

A SF non-profit organization since 1980. With a vision to protect cats.

Interested in cause:

ANIMAL, Animal Protection, Rescue, Welfare and Services

Activities:

3 months, 3 weeks ago
jfm acknowledged qcy and her benefactors with 5.00 EM for good work Donated money 3 months, 3 weeks ago
jfm acknowledged qcy and her benefactors with 2.00 EH for good work with other volunteers 3 months, 3 weeks ago
jfm acknowledged iu1 and his benefactors with 2.00 EH for good work with other volunteers 3 months, 3 weeks ago
jfm acknowledged laurainitial and her benefactors with 2.00 EH for good work with other volunteers 3 months, 3 weeks ago
jfm finished good work with other volunteers 3 months, 4 weeks ago
jfm finished good work Donated money 1 year, 3 months ago
jfm is following laurainitial 1 year, 4 months ago
jfm published volunteer need Need volunteers to help clean rooms and play with cats in cat shelter

FIG. 7

805

810

Your benefactors and your EP contribution to them:

"Balance" shows the net amount of EPs (in units of EM and EH) that a benefactor has in its EP account. "You Ack" shows the total amount of EPs that you have transferred to a benefactor to acknowledge its good work.

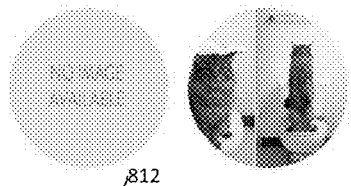

812 qry                          jim

814 { Balance: 5.53EM;        Balance: 23.16EM;
      -11.25EH;                 -6.83EH;
816 { You Ack: 5.40EM;        You Ack: 4.51EM;
      0.00EH;                   0.00EH;

820

Your beneficiaries and their EP contribution to you:

"Balance" shows the net amount of EPs (in units of EM and EH) that a beneficiary has in its EP account. "Ack You" shows the total amount of EPs that a beneficiary has transferred to you to acknowledge your good work; "Ack 2nd You" shows the total amount of EPs that has been distributed to you through a beneficiary when others acknowledge its good work.

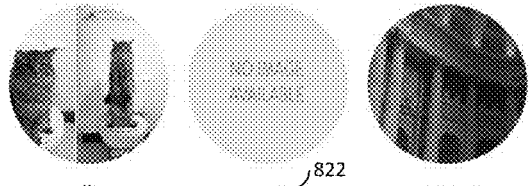

822 jim                           qry                          support

Balance: 23.16EM;   824 { Balance: 5.53EM;    Balance: -50.00EM;
  -6.83EH;                  -11.25EH;           -78.00EH;
Ack You: 0.00EM;    826 { Ack You: 0.00EM;    Ack You: 27.01EM;
  20.60EH;                  4.75EH;             23.40EH;
Ack 2nd You: 0.49EM;     Ack 2nd You: 0.25EM; } 828
  0.58EH;                   0.06EH;

830

You are following:

"Balance" shows the net amount of EPs (in units of EM and EH) that a user has in its EP account. "Ack" shows the total amount of EPs that a user has transferred to all its benefactors to acknowledge their good work; "Ack By" shows the total amount of EPs that a user's beneficiaries have transferred to it to acknowledge its good work; "Ack 2nd By" shows the total amount of EPs that has been distributed to a user through all its beneficiaries when others acknowledge their good work.

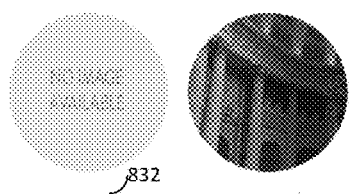

832 qry                           support

834 { Balance: 5.53EM;        Balance: -50.00EM;
      -11.25EH;                 -78.00EH;
835 { Ack 3 benefactors:      Ack 4 benefactors:
      9.02EM;14.70EH;           45.02EM;71.51EH;
836 { Ack By 3 beneficiaries:
      14.42EM;3.83EH;
837 { Ack 2nd By 6
      beneficiaries:
      1.11EM;1.13EH;

840

Activities:

qry finished good work Alumni helped at BigUniversity's new student move-in day qry applies to volunteer one time slot for Volunteer at BigUniversity's New Student Move-in Day

FIG. 9A 900

Your EP Accounts

Listed below are your accounts of ethical points (EPs). EPMONEY account is for ethical money points (in the unit of EM) which measures good work such as money donation on the basis of monetary amount that the benefactor has contributed. EPTIME account is for ethical time points (in the unit of EH) which measures good work such as volunteering on the basis of time amount that the benefactor has contributed.

Credit limit is the amount of free credits you can have for an EP account, which allows you to have a limited amount of negative balance in that account so that you may acknowledge others' good work with earned points before earning enough points yourself. Users who have filled tax identity information of Edit Your Profile will get credit limits assigned automatically.

You can view and search transaction details of your EP account by clicking on the 'Transaction Detail' link of that account in the 'Transactions' column.

| Account name 921 | Balance 922 | Unit 923 | Credit limit 924 | Transactions 925 |
|---|---|---|---|---|
| iu1_EPMONEY_2019_4_9 | 0.75 | EM | 5000.00 | Transaction Detail |
| iu1_EPTIME_2019_4_9 | 39.69 | EH | 5000.00 | Transaction Detail |

Transaction Details of Account "iu1_EPTIME_2019_4_9" 951

952 Happened later than (in the format of 2000-01-25 00:58):

Happened earlier than (in the format of 2000-12-25 23:58):

Work title contains: 953

Transaction list 954

| Time 955 | Description 956 | Amount 957 | Work 958 |
|---|---|---|---|
| Aug. 2, 2020, 10 p.m. | extract from jfm through qcy | 0.03 | with other volunteers |
| Aug. 2, 2020, 10 p.m. | from jfm | 1.90 | with other volunteers |
| Feb. 27, 2020, 6:50 a.m. | from support | 24.70 | Built cat houses for stray cats |
| Feb. 27, 2020, 6:50 a.m. | extract from support through jfm | 0.43 | Built cat houses for stray cats |
| July 9, 2019, 12:05 p.m. | from jfm | 1.90 | Rescued stray cats near golden park |
| July 9, 2019, 12:05 p.m. | extract from jfm through qcy | 0.03 | Rescued stray cats near golden park |
| April 9, 2019, 11:30 p.m. | from qcy | 0.35 | Built cat houses for stray cats |
| April 9, 2019, 11:26 p.m. | extract from qcy through jfm | 0.25 | Built cat houses for stray cats |
| April 9, 2019, 4:59 p.m. | from jfm | 9.50 | Built cat houses for stray cats |

1105

Title: Volunteer at BigUniversity's New Student Move-in Day ⸺1110

1111⸺ News type: Organization hosts/recruits volunteers.
1112⸺ For cause: Education Programs, Area Major Support, Scholarship and Financial Aid
1113⸺ Description : Volunteer at New Student Move-in Day to welcome students and their families, answer questions, pass out orientation materials, and share a bit about your BigUniversity experiences and memories to
1114⸺ help start the year off right for our students! Saturday, Sep 19 and Sep 26 8:00 a.m. – 12:00 p.m. (2-hour shifts available) BigUniversity Main Campus
1115⸺ Instruction file for confirmed volunteer applicants: Download file
1116⸺ Volunteer role: Community and Social Service, Alumni Service and Other Social Worker
      ⸺1117
1118⸺ Needed by BigUniversity from Sept. 19, 2020, 8 a.m. until Sept. 26, 2020, noon at 123 Fulton St. San Francisco, CA 19858.
      Published Sept. 17, 2020, 6:55 p.m. by BigUniversity.

(4 time slots)

Volunteer slots

| Start time ⸺1121 | End time ⸺1122 | Available spots ⸺1123 | Volunteer applicants ⸺1124 | Cancel slot | Confirm applicants | Confirmed applicants ⸺1127 | E-mail confirmed applicants |
|---|---|---|---|---|---|---|---|
| Sat Sept. 19, 2020, 8 a.m. | Sat Sept. 19, 2020, 10 a.m. | 4 | | Canceled | | | |
| Sat Sept. 19, 2020, 10 a.m. | Sat Sept. 19, 2020, noon | 3 | [unintelligible] | ⸺1126 | [confirm] | [unintelligible] | [email] |
| Sat Sept. 26, 2020, 8 a.m. | Sat Sept. 26, 2020, noon | 0 | Open [unintelligible] qty list | ⸺1125 Cancel | [confirm] | Open qty [unintelligible] | [email] ⸺1128 |
| Sat Sept. 26, 2020, 10 a.m. | Sat Sept. 26, 2020, noon | 0 | Open [unintelligible] qty list | Cancel | | | |

⸺1130

⸺1140

⸺1150
0 comments:

"Confirm Volunteer Applicants for "Volunteer at BigUniversity's New Student Move-in Day" from Sat Sept. 26, 2020, 8 a.m. till Sat Sept. 26, 2020, 10 a.m."

1210

You can send emails for confirming volunteer applicants of this volunteering slot to these receivers listed in the "Confirm applicants" field using the form below. By default, the list of "Confirm applicants" only include new applicants since last time you send confirmation and those applicants who have not been confirmed before for this slot. You can edit the default list and change receivers of this confirmation by clicking/unclicking applicant name(s) + "Ctrl" to unselect/select them. An email will also be copy sent to yourself automatically.

1220 Confirm applicants:

1230

1240 Sender username: BigUniversity

1250 Reply to: alumni@biguniversity.edu

Messages:

Search and Apply for Local Volunteer Opportunities

You can search for volunteer opportunities available locally based on your preferred duration and time using the form below and apply to them by clicking "Apply" in the result list. You may "Unapply" an applied opportunity before its confirmed by the needer (indicated by "Confirmed" replacing "Unapply" for that opportunity). To view all your applied volunteer opportunities, please go to Your Volunteer Applications.

1320 — Minimum duration (minutes) less than or equal to:
1321 — 60
1322 — Start time later than or equal to (in format of 2019-09-25 09:00): 2019-07-28 09:00
        End time earlier than or equal to (in the format of 2019-11-25 23:58): 2019-07-28 18:00
1323 — 
1324 — Needer username: jim
1325 — Need title contains: cat shelter
        Description contains:
1326 — Address:
        City:
1327 — Zipcode:
        Cause:
1328 — Animal Protection, Rescue, Welfare and S
        Volunteer role:
1329 — [Search]

Volunteer opportunity list

| Needer (1331) | Start time (1332) | End time (1333) | Address | City (1334) | Zipcode | Need (1335) | Available spots (1336) | Apply |
|---|---|---|---|---|---|---|---|---|
| jim | Sun July 28, 2019, 9:30 a.m. | Sun July 28, 2019, 10:30 a.m. | 425 1st Str | San Francisco | 94105 | Need volunteers to help clean rooms and play with cats in cat shelter | 2 | Confirmed (1339) |
| jim | Sun July 28, 2019, 1:30 p.m. | Sun July 28, 2019, 2:30 p.m. | 425 1st Str | San Francisco | 94105 | Need volunteers to help clean rooms and play with cats in cat shelter | 3 | Unapply (1338) |
| jim | Sun July 28, 2019, 3:30 p.m. | Sun July 28, 2019, 4:30 p.m. | 425 1st Str | San Francisco | 94105 | Need volunteers to help clean rooms and play with cats in cat shelter | 4 | Apply (1337) |

Your Volunteer Applications

You can use this form to search your volunteer applications. If no value is given for field "Start time later than", only those volunteer slots that have not started yet are displayed by default. Regardless of your search status, by clicking "Send Confirmed Slots to My Calendar" button, you can email and add your active applied slots (those that have been confirmed and not canceled by volunteer needers, and have not started) to your calendars easily.

Canceled by needer: ☐
Start time later than (in the format of 2019-03-25 08:00):
2020-03-10 08:00
Start time earlier than (in the format of 2019-11-25 23:59):
2020-09-26 17:00
Needer username:
City:
Need title contains: BigUniversity

[Submit] — 1429

Your application list — 1430

| Start time 1431 | End time 1432 | Needer 1433 | Address | City 1434 | Zipcode | Need 1435 | Confirmed by needer 1436 | Canceled by needer 1437 |
|---|---|---|---|---|---|---|---|---|
| Sat Sept. 19, 2020, 10 a.m. | Sat Sept. 19, 2020, noon | BigUniversity | 123 Fulton St | San Francisco | 19958 | Volunteer at BigUniversity's New Student Move-in Day | Confirmed | |
| Sat Sept. 26, 2020, 8 a.m. | Sat Sept. 26, 2020, 10 a.m. | BigUniversity | 123 Fulton St | San Francisco | 19958 | Volunteer at BigUniversity's New Student Move-in Day | Confirmed | |
| Sat Sept. 26, 2020, 10 a.m. | Sat Sept. 26, 2020, noon | BigUniversity | 123 Fulton St | San Francisco | 19950 | Volunteer at BigUniversity's New Student Move-in Day | | |

Post a Good Work from Volunteer Need

1505 — Title: Alumni helped at BigUniversi

1510 — Visibility: Public to others

1515
- Time started: 2020-09-19 08:00
- Time finished: 2020-09-26 12:00

1520
- Address: 123 Fulton St
- City: San Francisco
- State: California
- Country: USA
- Zipcode: 13658

1525 — Causes:
- ANIMAL: Animal Protection, Rescue, Welfare and Services
- HUMAN: Child, Youth, Senior, Homeless Support, Food Bank and Other Human Services
- CIVIL: Civil Rights, Community Development and Societal Benefit
- CULTURE: Libraries, Museums, Media and Cultures
- ☒ EDUCATION: Education Programs, Alma Mater Support, Scholarship and Financial Aid
- ENVIRONMENT: Environment Protection and Conservation
- HEALTH: Disease Prevention and Treatment, Health Promotion and Other Health Services
- RESEARCH: Scientific, Technological, Social and Other Research
- RELIGION: Faith, Religious Programs and Literature 1530 — Work description:
This good work is finished via volunteers who helped with need Volunteer at BigUniversity's New Student Move-in Day.

1535 — Work image: Browse... No file selected.

1540 — Work file: Browse... No file selected.

1545 — Work type: Organization donated service via volunteers.

1550 — Work role: Community and Social Service: Alumni Service and Other Social Worker 1555 — Benefactor username: BigUniversity 1560 — Work unit: hour Work amount: 8.00

1570 — Participated volunteers:

| 1572 Start time | 1574 End time | 1576 Confirmed volunteer applicants | 1578 Usernames of other volunteers |
|---|---|---|---|
| 2020-09-19 10:00:00 | 2020-09-19 12:00:00 | ▓▓ | |
| 2020-09-26 08:00:00 | 2020-09-26 10:00:00 | ▓▓ | |
| 2020-09-26 10:00:00 | 2020-09-26 12:00:00 | | gcyl |

1580 — Submit

FIG. 15

METHODS AND SYSTEMS FOR EVALUATING, REWARDING AND FACILITATING PHILANTHROPIC WORKS

CROSS-REFERENCE TO RELATED APPLICATIONS

This application is a Continuation of U.S. patent application Ser. No. 17/093,566, filed on Nov. 9, 2020, entitled "Method and System for Evaluating, Rewarding and Facilitating Philanthropic Works".

BACKGROUND OF THE INVENTION

Philanthropic work such as volunteering, pro bono service, donation and charitable grant has a huge impact on human wellbeing, health and life satisfaction. There are more than 1.8 million active non-profit organizations in the United States and many of them rely on philanthropic work in their daily operations to fulfill mission and achieve goals. However, reports indicate that, while nonprofits have benefitted from record highs in philanthropic work in recent years, fewer people on average are volunteering and contributing money in the developed world than two decades ago, and engaging more people back is a challenging work.

Many types of incentive programs have been offered to encourage more people to volunteer or donate, such as discounts and offers from businesses, shops and merchants, or matched donations by sponsors. For example, A UK volunteering charity, VInspired, has launched a rewards card which offers volunteers benefits and discounts when travelling across Europe. U.S. Pat. No. 10,679,237 describes a system that partners with merchants like Macy's and other social funds to reward rebate to donors or raise fund for cause (also called "beneficiary" of the raised fund). Generally, these systems bundle rewards to volunteering or campaign causes with certain consumption, or offer rebates to donations matched by sponsors, which puts a burden on the vendor or sponsor, and may bear risks of being discontinued. There's a need for incentive mechanism that is based on actual philanthropic works instead of consumptions or sponsorships. In other areas, multilevel commissions have been applied to incentivize businesses to grow. For example, U.S. Pat. No. 8,606,675 implements a power commission structure in which a business owner will get increased payout (i.e., a 2%, 3%, 5%, 6% commission) as it has sponsored increased number (i.e., 4, 16, 64, 256) of other businesses underneath. While it's tempting to reward a philanthropic benefactor according to the number of its direct and indirect beneficiaries, a better direction would be to reward a benefactor according to the value brought to its direct and indirect beneficiaries by its work. It's an object of this invention to provide system and method that will encourage people to continuously involve in philanthropic works that bring about more value and be more self-sustained.

Research finds that although most volunteers and donors may not be driven by material compensation, they do expect certain return, such as acknowledgment, recognition, appreciation and impact of their philanthropic work. If volunteers and donors do not feel their expertise, time and money be made best use of, or if their philanthropic work does not make a difference, they may not stay. It seems natural and obvious to recognize and reward volunteers based on their volunteer time. Although many, including websites and software applications such as VolunteerHub®, record volunteer time, they either do not provide time based rewards, or the rewards by different systems can be inconsistent and disparate. None of them determines interchangeable reward values based on volunteer time for different works. As volunteers want to be well-regarded and fairly rewarded for their contribution, an effective system to incentivize comprehensive philanthropic contributions needs to enable consistent rewards by determining interchangeable values for various philanthropic works. For example, it's obvious that the rewards for an hour of voluntary teaching of high school mathematics shall probably be higher than an hour of voluntary teaching of primary school mathematics. Saxena (U.S. Patent Publication No. 20150199640) mentioned about rewarding volunteers in an online social learning platform by "incrementing the user's account of volunteer time", and "the amount of time depends at least partially on an experience level of the user", without many specifics. But what about an hour of pro bono legal service versus an hour of volunteer emergency veterinary care? Which one should be evaluated higher and how much higher? Besides volunteer time and experience level, what other factors need to be considered? No existent system and method has been offered to tackle this complexity. It's also an object of this invention to provide method and system enabling more fair, consistent evaluation of, and hence interchangeable rewards for, various philanthropic works based on specific attributes of the work, which may further incorporate other potential determinants and complexities.

Besides deserved recognition and fair evaluation, volunteers and donors want to know how their philanthropic works make a difference, and want their philanthropic support be allocated to those that get better results and make systemic social changes. Many existent systems such as CharityNavigator®, GuideStar® and Better Business Bureau®, rate nonprofits based on financial metrics such as program and administrative expenses and amount of raised funds according to tax return reports, which mainly measure nonprofits' operational and administrative inputs rather than outputs or impact that those inputs have generated on the beneficiaries or the society. Some systems such as VolunteerHub® provide volunteer satisfaction, attendance or number of participating volunteers as metrics for volunteer impact, which measure impact on volunteers rather than impact on the society brought by volunteer's work. Other metrics such as number of actions taken or stakeholders reached, number of people with an improved experience as a result of work, number of virtual interactions, etc., have been mentioned, and survey, via multiple media or channels, is suggested as the method for collecting data for these metrics. However, among limitations such as being verbose, cumbersome and expensive, these metrics based on self-report surveys could lack unified standards, and have a tendency to simply reward quantity or number of clicks. Without an easy-to-use and universal measurement of impact of philanthropic work, which has long been a challenge especially due to its complex social characteristics, valid comparison and effective philanthropic resource allocation are impossible. A further object of this invention is to provide method and system that offer easy-to-use and universally comparable measurements of outputs and impact, including long-term impact, brought by works of non-profit organizations, volunteers and other philanthropists, which may be used to facilitate more effective and strategic philanthropic resource allocation.

In addition to incentive systems, efforts have been made to facilitate volunteering by improving communication and coordination among volunteers and nonprofits. For example, U.S. Pat. No. 8,548,839 describes a system for facilitating healthcare volunteering by matching volunteers based on location and distance between volunteers and public health events. Some volunteer matching systems, such as VolunteerMatch®, offer matchmaking of volunteers and opportunities. However, these systems typically ask volunteers about their interests and estimated availability when they registered as a user. This means that the available time of volunteers used for matchmaking are generally rough ranges. Since those registered volunteers' personal time schedule may change subsequently, organizations may need to constantly communicate and check with those matched volunteers in terms of availability, or may find registered volunteers unavailable when needed. A further object of this invention is to facilitate philanthropic works by enabling volunteers to flexibly utilize their available tiny time as much as possible, and offering simplified coordination, documentation and rewarding correspondingly.

BRIEF DESCRIPTION OF THE DRAWINGS

FIG. 5 depicts an interface that shows a philanthropic work according to an exemplary embodiment.

FIG. 6 depicts an interface that enables a beneficiary user to verify contribution and reward points to a plural of benefactors and potential indirect benefactors according to an exemplary embodiment.

FIG. 7 depicts an interface displaying a profile of a user which comprises the user's rewarding accounts summary information, philanthropic work related activities and a donation section, according to an exemplary embodiment.

FIG. 8 depicts an interface displaying a following dashboard of a user which comprises rewarding accounts summary information and philanthropic work related activities of the user's benefactors, beneficiaries, and other users followed by the user, according to an exemplary embodiment. according to an exemplary embodiment.

FIGS. 9A and 9B depict interfaces displaying basic information and transaction details of a user's rewarding accounts according to exemplary embodiments.

FIG. 11 depicts an interface displaying a management dashboard with relevant options automatically determined by the system that enables a philanthropic work requester to coordinate with applicants to request slots, according to an exemplary embodiment.

FIG. 12 depicts an interface that enables a philanthropic work requester to communicate with relevant applicants automatically determined by the system according to an exemplary embodiment.

FIG. 13 depicts an interface that enables a user to search and (un/)apply to philanthropic work request slots according to an exemplary embodiment.

FIG. 14 depicts an interface that enables a user to search, view and add to calendar its volunteer applications to philanthropic work request slots according to an exemplary embodiment.

FIG. 15 depicts an interface displaying an automatically generated philanthropic work submission based on a finished philanthropic work request, according to an exemplary embodiment.

DETAILED DESCRIPTION

Figure 1:
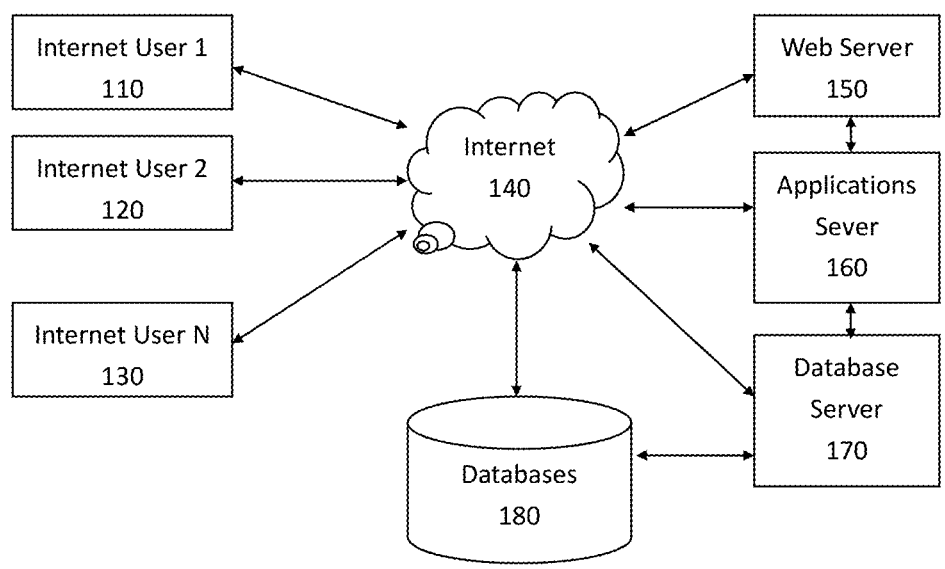
FIG. 1 is a diagram of the client-server architecture of a system according to an exemplary embodiment.

It should be understood that this disclosure is exemplary illustration of the invention, and is not intended to limit the embodiments or to exclude other embodiments with modifications and variations but not departing the scope or spirit of the invention. It should also to be understood that the terminology used here is not intended to be limiting. As used in the specification and the claims, the singular forms "a", "an" and "the" include plural referents as well, unless the context clearly indicates otherwise.

Method and system according to exemplary embodiments may provide users a platform and/or applications to record, evaluate, reward and facilitate philanthropic works. The users mentioned in the system and method can be a single person, an organization such as a business, a non-profit or other type of organization that registers to use a platform and/or applications of the system. In the system and method, a benefactor of a philanthropic work is a person or organization that helps others by giving monetary contribution or charitable grant, volunteering time or expertise, or organizing those philanthropic works for them. A beneficiary of a philanthropic work is a person or organization that has benefited from others' volunteering, donation, grant or help and publicly expresses thanks and rewards them. The system and method dynamically maintains a benefactor-beneficiary relation data that reflects the historical philanthropic benefactor and beneficiary relationships among users.

In one embodiment, a user may submit electronically a finished philanthropic work to the system using a user device. The submission may comprise (1) descriptive information of the philanthropic work such as work title, type, role, amount of money or time contributed by the benefactor(/s), location, time, description, and philanthropic cause(/s) related to the work, etc., (2) evidence of the philanthropic work such as documents, photos, videos, audios, links to them, etc., and (3) publish preference of the philanthropic work indicating whether the user intends to post the work publicly or privately. In some situations, the philanthropic work may be submitted by the benefactor. In other situations, the philanthropic work may be submitted by others. A philanthropic work may be displayed by the system publicly or privately based on the publish preference in the submission and the type of the work. For example, an anonymous money donation may be displayed only to the donor itself as a private record. A philanthropic work done with contribution from volunteers may be displayed publicly so that potential beneficiary users can view and reward the participating volunteers. In one embodiment, money donation made by a user to another user via the system can generate public or private philanthropic work submission automatically by the system, depending on anonymity of the donation. In various embodiments, a published philanthropic work can be viewed, searched, commented, and shared with others by any users. Beneficiary users can acknowledge (i.e., reward) benefactors of a published philanthropic work.

Based on a published philanthropic work, a beneficiary user may reward benefactors of the philanthropic work by paying out rewards from the user's rewarding accounts. The rewarding accounts can be based on digital representations in format of points or tokens that measure time or monetary value in nominal units. In various embodiments, a user has rewarding accounts, called ethical accounts, which contain rewarding points, called ethical points, measured in (1) monetary unit used for rewarding monetary contribution such as money or property donation and grant, and in (2) time unit used for rewarding time contribution such as volunteering and pro bono service. The system and method may initialize the rewarding accounts of a user with certain amount of rewarding points or credits based on the user's profile. In one embodiment, the system may assign a credit limit to a rewarding account of a user, which allows the user to have a limited negative balance in the rewarding account. In another embodiment, the system may directly add an amount of points to a rewarding account of a user. In various embodiments, a benefactor may be rewarded points based on the monetary value it contributed in a philanthropic work, e.g., the amount of donated money, or based on the time it contributed in a philanthropic work, e.g., the amount of time spent in a pro bono service. The system and method provide a reference amount of rewarding points to be received by a benefactor based on the benefactor's contribution and attributes of the philanthropic work. The reference amount of rewarding points in monetary unit can be set to be equal to the amount of monetary contribution. The reference amount of rewarding points in time unit may not be equal to the raw amount of time contribution, and may be adjusted by the method and system to reflect different time values associated with different philanthropic works, so that the rewarding points are interchangeable, and the rewards are consistent and fair enough to be incentive. For example, an hour of pro bono legal service may be associated with more than one rewarding points in time unit. In various embodiments, the adjustment is implemented by an evaluation module of the system and method that determines an adjusted reference amount of rewarding points in time unit corresponding to a benefactor's philanthropic work based on the work's information. In some embodiments, the evaluation module may use private or public data, or the sampling, integration, indexing and other processed results of them, and an evaluation function to determine time values for specific philanthropic works. For example, the adjusted time value of a philanthropic work can be related to specific work description, role, location, time or cause to reflect a fair compensation for the time of work contributed by the benefactor, and can be in the form of an absolute amount or in the form of an indexed amount. In some embodiments, rules, mathematical models or machine learning algorithms may be used in the evaluation function to relate time values with information of philanthropic works.

In various embodiments, a beneficiary user is allowed to override the reference amount of rewarding points determined by the evaluation module of the system and input another amount to be paid out to the benefactor, to further incorporate unobservable determinants such as subjective appraisal and other potential complexities into the evaluation of philanthropic works. In one embodiment, the reference amount of rewarding points to a benefactor determined by the system and method is displayed to a potential beneficiary user as a default amount of rewarding points to be paid out to the benefactor. And the raw amount of contribution by the benefactor described in the published philanthropic work may also be displayed to the potential beneficiary user. The potential beneficiary user is allowed to change the amount of rewarding points to be paid out by overriding the default referenced amount. The potential beneficiary user may also be allowed to verify the displayed raw amount of benefactor contribution and change it according to how much it has actually benefited from the benefactor's philanthropic work.

In some embodiments, inputs by beneficiary users who override the reference amounts of rewarding points determined by the method and system and the raw contribution amounts described in published philanthropic works may be further used for the updating of the evaluation function of the evaluation module, either at regular intervals, or in a real-time manner.

When a beneficiary user pays out an amount of rewarding points to a benefactor for a published philanthropic work, either by accepting the reference rewarding amount or by inputting another amount, the system and method may automatically calculate and distribute a portion of the paid out amount to all the indirect benefactors who were benefactors of the target benefactor, by retrieving on the benefactor-beneficiary relation, and determining a corresponding rewarding amount to be received by each of them. In some embodiments, a portion of the rewarding points are distributed among indirect receivers of different degree levels according to the degree level the receivers are linked with the beneficiary user, and are then distributed among each receivers at each same degree level equally. For example, the system and method may implement an arithmetic progression distributing rule in which the difference of the progression is a negative value, or a geometric progression distributing rule in which the common ratio of the progression is a value less than 1, to calculate the total amount $A_n$ received by all the $n^{th}$ degree indirect benefactor receivers, and then distributes $A_n$ equally among those $n^{th}$ degree receivers. In other embodiments, the distributing rules may be arbitrary, or the beneficiary users are allowed to configure the distribution parameters, or some of the rewarding points may be distributed to the platform.

In various embodiments, a user is enabled to view, filter and search on the information of its rewarding account such as the account name, balance, unit, credit limit, and transaction history which include details of all the transactions of the rewarding account. In one embodiment, a transaction detail includes information of transaction time, amount of points transferred, related philanthropic work, paying user, target receiver, and indirect receivers, if there're any, through which an indirect reward was distributed. In various embodiments, a user's rewarding accounts' balances and other summary information based on rewarding accounts of its direct and indirect benefactors and beneficiaries may be displayed on the user's profile or on lists of users, which may be viewed or sorted by other users who are potential donors or volunteers. In one embodiment, a user can opt to receive money donations from other users via the system after verifying its security compliant account for receiving donation money, and other users can view a potential donee's profile which includes basic information, philanthropic work related activities, rewarding accounts' balances and other summary information. Rewarding accounts' balances and summary information of users may be sorted and displayed side by side when a potential donor or volunteer searches for and compares potential donees or volunteer requesters. In some embodiments, the summary information of rewarding accounts of a user may include a sum of rewarding points a user has transferred to all of its direct benefactors, and sums of rewarding points distributed to a user by all of its direct and indirect beneficiaries, reflecting correspondingly that how much a user has acknowledged all its helpers for their good works, how much a user has involved in philanthropic works itself to bring about value to others, and how much a user has helped other people who further involve in philanthropic works to bring about more value and hence been indirectly rewarded with distributed points through them. These summary information provide simple and universally comparable measurements of value and (/long-term) impact brought about by a user through various philanthropic works, in the unit of work adjusted time for time measured works, or in the unit of monetary value for monetary works, so that potential donors, funders and volunteers may consider and compare on when allocating their philanthropic supports. In various embodiments, the system and method may automatically generate donation receipt and philanthropic work submission based on money donation made by a user via the system, and depending on whether the donation is anonymous, display it publicly or privately, and reward the donor as well as its previous benefactors by automatically transferring rewarding points in monetary unit out from the donee to them, so that the donor need not manually submit donation work or invite donees for rewards, and the donee need not manually search for the donation work to reward the donor.

In various embodiments, a user is enabled to follow and un-follow other users and is provided a following dashboard which displays rewarding accounts' balances and summary information of its direct and indirect benefactors and beneficiaries, as well as updated information about philanthropic works and related activities of other users it follows. The updated information about philanthropic works and related activities of a user may include the user finishing, publishing, rewarding, requesting, applying to requests of, and commenting on a philanthropic work, etc. In some embodiments, a user's following dashboard may show updated information about philanthropic works and related activities of the user's benefactors and beneficiaries if the user is following nobody. In one embodiment, the summary information of rewarding accounts included in a user's following dashboard may include sums of rewarding points that the user has transferred to each of its direct benefactors, and sums of rewarding points distributed to the user by or through each of its beneficiaries, reflecting correspondingly that how much a user has acknowledged each of its benefactors for their good works, how much a user has involved in philanthropic works itself to bring about value to each of its beneficiaries, and how much a user has helped each of its beneficiaries who further involve in philanthropic works to bring about more value and hence been indirectly rewarded with distributed points through that beneficiary.

In one embodiment, a user may submit electronically a philanthropic work request, such as a volunteer need to recruit volunteers, to the system using a user device. The submission may include the requested work's type, description, work role, starting and ending time, the minimum time duration an applicant needs to work for, the estimated number of applicants needed for the said durations, work location, related philanthropic causes, skills needed, instructions, whether the request is repeating and repeating rules, etc. The requester is allowed to review its submission and decide whether to edit or cancel the request before publishing it. Based on the submitted philanthropic work request, the system may generate request time slots automatically and enable a user to search for, apply and un-apply to before being confirmed by the requester, or be matched with specific time slots of a published request. A user is also enabled to view, search, comment, and share with others published philanthropic work requests. On one hand, a requester can invite potential applicants to apply for a philanthropic work request by sending emails to them via the system. On the other hand, a potential applicant is enabled to search for philanthropic work requests based on search criteria such as starting and ending time, minimum durations, requested role, requester, request title, description, location and related philanthropic cause, etc. As the system provides evaluations reflecting fair time values associated with various philanthropic works as well as explicit measurements of impact, users may expect their volunteer time will be fairly rewarded and make an observable difference, therefore be more incentivized to actively search and apply to philanthropic work requests. Including minimum durations may also enhance the probability that a potential volunteer will find a matched volunteer request. Some alternative embodiments may further include bidding mechanism. For example, an applicant may be matched to request with the highest rewarding bid, and a request may be matched to applicant with lowest rewarding ask.

In various embodiments, a philanthropic work requester is enabled to manage the request for coordination and communications such as scheduling, confirming applications, sending messages or cancelling time slots via system provided management dashboard that is configured to simplify the flow of work, offer efficient batch operations and avoid omissions or repetitions. In one embodiment, the management dashboard may include dynamically generated request time slots, buttons, links, user lists and message templates depending on different stages of the request management process and current requesting and applying situations. All the buttons, links and lists are shown in the dashboard only when certain options are available, certain actions are necessary, or certain operations are executable, and are shown in one place, so that the requester can have the picture of the whole while not getting lost in a sea of options. The requester can take necessary actions and accomplish batch operations efficiently by a few clicks to accept, select from, or make minor changes to those automatically determined default options and templates without mistakes. For example, before confirmation, option of cancelling a request time slot is allowed when nobody has applied to that slot, until otherwise. At any time point during the confirmation stage, a requester may confirm all or only one or some of the currently unconfirmed volunteer applicants to a request time slot and send confirmation to them via batch emails using pre-configured message template, by accepting or (/un) selecting from the dynamically determined applicants list, and need not worry about missing any new applicants or confirming an applicant twice by mistake. If a requester confirmed some of the applicants for a request time slot at one time, only new applicants to the time slot since then and those who have not been confirmed will be included in the default list of applicants to be confirmed next time. In the later stages, a requester is enabled to message all currently confirmed applicants to a request time slot to give the latest instructions or to announce cancellation of that confirmed slot, or to communicate with only some of them for specific messages. A requester can also make changes to the message templates which are dynamically provided by the system according to the current communication stage. In various embodiments, an applicant to philanthropic work requests may simply click one button to add all active applied time slots, which have been confirmed and not cancelled by requesters, and have not started yet, to personal calendar such as iCalendar, Outlook Calendar, or Google Calendar.

In various embodiments, a philanthropic work requester is enabled to generate philanthropic work submission based on finished philanthropic work request automatically, so that the work can be accurately documented without the recalling of details and the manual inputting by the requester. In one embodiment, after the ending time of a philanthropic work request, the requester is provided with philanthropic work submission form with pre-filled information of the work such as work type, location, time, description text, work role, benefactors and volunteers as well as their corresponding contribution time, etc., which can be verified and edited by the requester. For example, the requester is enabled to edit the list of participated volunteers to delete those no-shows and add those who didn't apply but actually participated in corresponding time slots upon submitting the automatically generated philanthropic work. In various embodiments, if a philanthropic work request has multiple time slots, the requester can generate one single philanthropic work submission after all the time slots have finished, or generate multiple philanthropic work submissions based on some of the finished time slots as needed. The system may verify if a request time slot has finished and has not been used as a basis to generate philanthropic work submission, before generating a philanthropic work submission based on it, to ensure there's no missing or duplicate record for finished philanthropic works.

FIG. 1 illustrates a client-server architecture of a system according to an exemplary embodiment. Networked system 100 includes a plural of internet users 110, 120, . . . and 130, a web server 150, an applications server 160, a database server 170, and a database 180 connected via the internet 140. Each internet user has user device that may have display screen, computing processor, storage, and can communicate with a network such as the internet 140 to access the web server 150 which handles user's requests for web resources such as HTML pages, images, files, etc., and the applications server 160 which executes computer programs to provide applications functions. The user devices of internet users 110, 120, . . . and 130 can be computers like desktops and laptops, portable devices like mobile phones and tablets, or a combination of them. Database server 170 may communicate with the servers 150 and 160 and the devices of internet users to facilitate access to one or more databases 180, via the internet 140 or over direct connections. The internet users may be provided with downloadable apps or programs that run on the users' devices. In alternative embodiments, system architectures other than a client server architecture, such as peer-to-peer or mixed ones, may be implemented. Some of the components may be implemented in other combinations, for instance, the servers 150 and 160 may be combined as one web application server. In some embodiments, the system may use a intranet or LAN instead of the internet or WAN, or a combination of the two.

Figure 3:
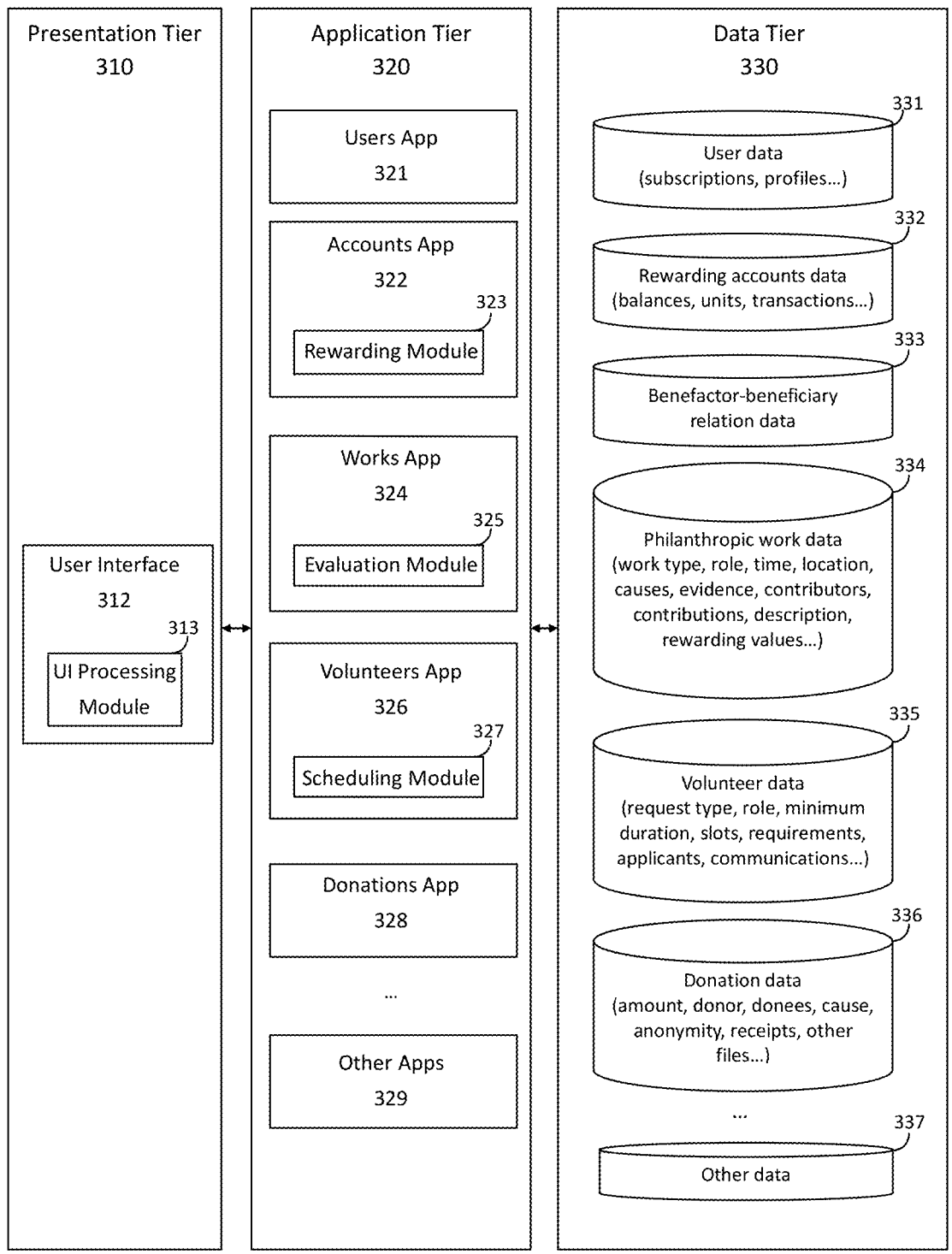
FIG. 3 is a diagram that illustrates the functional components of a system according to an exemplary embodiment.

In one embodiment, the system may be implemented in a three-tier architecture, in which the presentation, application processing and data management functions are physically separated. As shown in FIG. 3, an exemplary three-tier architecture system 300 may include a presentation tier 310, an application tier 320, and a data tier 330. The presentation tier 310 handles user interface 312 via a UI processing module 313 which may execute on a web server to receives input from and display information to users' devices, and may provide initial input validation by scripts embedded in client side. The application tier 320 may execute on a applications server containing modularized and extendable computer programs or applications to implement business logic and service functions of the system and method, and to determine and generate content to be handled by the presentation tier 310. The data tier 330 manages databases and provides access to data used by application tier 320 and may maintain and collect data located on local or remote storage facilities. In some alternative embodiments, the system may include more layers as needed, and the applications and function modules may be decomposed, recombined, extended or be duplicated.

In one embodiment, application tier 320 includes a users application 321, an accounts application 322, a works application 324, a volunteers application 326, a donations application 328, and other applications 329. Users application 321 implements the functions of user management including user registration, login, subscription, profile maintaining, user search and sort, socialization, privacy setting, etc. Accounts application 322 implements the functions of rewarding accounts maintenance and management comprising initializing accounts, logging transactions and updating balances and other information, verifying, transferring and distributing rewarding points to accounts via a rewarding module 323. Works application 324 implements the functions of philanthropic work management comprising work submission, display, search, share, comment, reward, and determining rewarding values for philanthropic works via an evaluation module 325. Volunteers application 326 implements the functions of philanthropic work requests management comprising processing requests, responses, previews, cancels, shares, comments, searches, matches, communications and slot scheduling and coordination via a scheduling module 327. Donations application 328 implements functions of money donation management including giving cart, online payment processing, transaction logging, account verification, receipts generation, donation history for donor/donee, donee search, other documentation, etc. Other applications 329 implements other functions and common utilities for system operation and optimization. In alternative embodiments, some of the functions may be implemented in other applications, modules, components or combinations.

In one embodiment, as shown in FIG. 3, stored in the databases of data tier 330 are user data 331 comprising information of user profile, following relations, and user subscription, etc., rewarding accounts data 332 comprising information of each user's rewarding accounts and their balances, units, transaction details and history, etc., benefactor-beneficiary relation 333 comprising information of the benefactor and beneficiary relationships among users, philanthropic work data 334 comprising information of philanthropic work type, role, location, contributors, contributions, evidence, descriptions, rewarding values, etc., volunteer data 335 comprising information of philanthropic work request's type, role, minimum duration, time slots, skills and requirements, applicants, etc., donation data 336 comprising information of donor, donee, donation amount, anonymity, related causes, receipts, other documents, etc., and other data 337 comprising data of other applications and common utilities. Some of the data may include other fields or combinations of fields, be stored in other databases with other names, or be located or duplicated, for instance, on local attached or remote linked storage or storage facilities. For example, the benefactor and beneficiary relation may be stored within user data in alternative embodiments.

Figure 2:
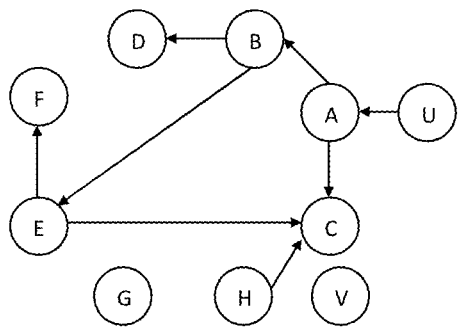
FIGS. 2A and 2B depict a graph of benefactor-beneficiary relationships among a plural of users, and an illustration of receivers of different degree levels and corresponding rewarding amounts distributed to them, according to an exemplary embodiment.

FIGS. 2A and 2B depict a graph of benefactor-beneficiary relationships among a plural of users and an illustration of rewards receivers of different degree levels and corresponding amounts of rewarding points distributed to them, according to an exemplary embodiment. As illustrated in FIG. 2A, vertices A to H, U, and V are users, and edges represent benefactor-beneficiary relationships with the arrow pointing to the benefactor. Correspondingly, FIG. 2B shows that, under a distribution rule of geometric progression with a common ratio of 0.1 among different degree levels and mean distribution within the same degree level, if user U, a beneficiary of a benefactor user A, pays out 100 points for A's philanthropic work, the second degree benefactors users B and C will each get 5 points, and the third degree benefactors users D, E and F will each get 0.33 points, and the third degree benefactor user F will get 0.1 points. Similarly, if user V, a beneficiary of a benefactor user H, pays out 100 points for H's philanthropic work, the second degree benefactor user C will get 10 points, the third degree benefactor user G will get 1 point. Alternatively, arithmetic progression and other arbitrary distribution rules can be applied to determine the corresponding rewarding amounts that each receiver will receive.

Figure 4:
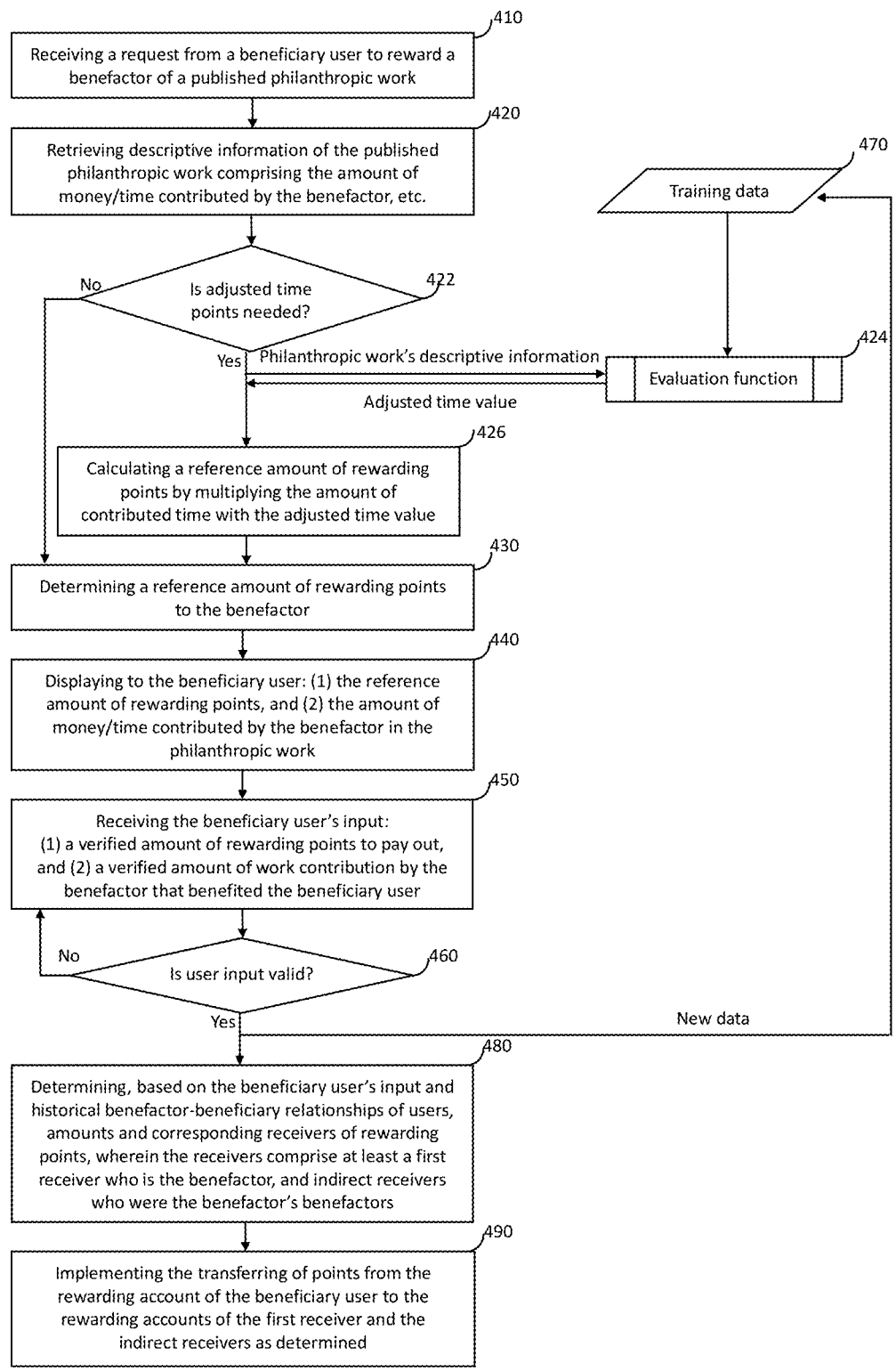
FIG. 4 is a flow chart that illustrates a method for determining a reference amount of rewarding points to a benefactor of a philanthropic work and enabling a beneficiary user to verify and reward the benefactor and potential indirect benefactors, according to an exemplary embodiment.

FIG. 4 is a flow chart that illustrates a method for determining a reference amount of rewarding points to a benefactor of a philanthropic work and enabling a beneficiary user to verify and reward the benefactor and potential indirect benefactors, according to an exemplary embodiment. The method 400 may be implemented by a networked system 100 described in FIG. 1. The method 400 begins at step 410 by receiving a request from a beneficiary user to reward a benefactor of a published philanthropic work. The method 400 retrieves descriptive information of the philanthropic work comprising work type, location, time, related philanthropic cause, benefactor's work role, amount of money or time contributed by the benefactor, description, title, related philanthropic cause, etc. The method 400 parses the descriptive information of the work at step 420 to decide whether an adjusted amount of reference rewarding points in the unit of time needs to be calculated at step 422. In some cases, if there's no need to calculate an adjusted amount of time points, for instance, when the benefactor of the philanthropic work contributed money, the method goes directly to step 430 to determine a reference amount of rewarding points to the benefactor, in which the reference amount is set to be equal to the amount of money or time contributed by the benefactor in the philanthropic work. On the other hand, if there's a need to calculate an adjusted amount of time points, the method 400 goes to step 424 in which an evaluation function provides an adjusted time value of the benefactor's philanthropic work, using the descriptive information of the work as input, and returning an adjusted time value as output. At step 426, the adjusted time value determined by step 424 is multiplied with the amount of time contributed by the benefactor retrieved by step 420, to calculate an adjusted amount of rewarding points in time unit. Once the adjusted amount of rewarding points is calculated, it is set as the reference amount of rewarding points to the benefactor at step 430. At step 440, the method 400 provides a user interface for the beneficiary user to verify the benefactor's contribution and reward the benefactor by paying out points to it. The user interface includes at least an input field which displays the reference amount of rewarding points determined by step 430 as a default rewarding amount to be paid out, and an input field which displays the amount of money or time contributed by the benefactor retrieved by step 420 as a default amount of work contribution by the benefactor in the philanthropic work, which can both be overridden by the beneficiary user's input. At step 450, the method receives input by the beneficiary user via the user interface which comprises at least a verified amount of rewarding points that the beneficiary user intends to pay out to the benefactor, and a verified amount of work contribution by the benefactor that benefited the beneficiary user. At step 460, the user's input is validated. If the user's input is invalid, for example, the user inputs an negative amount, or the paying amount surpasses the available amount from the user's rewarding account, the user is displayed with error message and is required to input again. If the user's input is valid, on the other hand, the method 400 then arrives at step 480 to further determine, based on the valid user input and historical benefactor-beneficiary relationships of users, specific received amounts of rewarding points as well as receivers of the corresponding points, wherein the receivers comprise at least a first receiver who is the benefactor, and potential indirect receivers who were the benefactor's previous benefactors, if there're any. At step 490, the method 400 implements the transferring of points from the rewarding account of the beneficiary user to the rewarding accounts of the at least first receiver and the indirect receivers as determined by step 480. At step 470, valid paying amount and contribution amount input by beneficiary users are further used as new training data to update the evaluation function for determining adjusted time values for philanthropic works. The flow chart of method 400 is meant to be illustrative only, some steps may be separately listed as a method with its own steps, some steps may be executed in other order, and some steps may be simplified or further extended. For example, the amount of money or time contributed by the benefactor in the philanthropic work may not be included for display or verification at steps 440 or 450, or step 470 may be optional in some embodiments.

FIG. 5 depicts an interface that shows a philanthropic work, according to an exemplary embodiment. The interface 500 may be displayed on a user's device after a user submitting a public philanthropic work which is visible to other users, or after a user submitting a private philanthropic work which is only visible to the user itself by clicking the Good Work button 501 on a navigation bar and selecting Post Good Works, or after a user searching out a good work by clicking the Good Work button 501 on a navigation bar and selecting Good Work Search, or after a user clicking a link elsewhere in the system that leads to the interface. This example interface 500 displays a published philanthropic work, includes work title 505, work type 510, work role 515, philanthropic cause related to the work 520, time and location of the work 525, benefactors of the work and their corresponding contributions 530, work description 540, photo evidence of the work 545, publishing time 550 and author of the published work 555. In this example, the benefactors of the philanthropic work include an organizer 532 and three volunteers 534, who have each contributed certain amount of time as shown beside the username the corresponding benefactor, while the username in greed color is a link that will leads to the user's profile. Also included in the interface 500 are an Acknowledge button 560 which allows a beneficiary user to acknowledge benefactors of this philanthropic work by rewarding points to them, a Share button 570 which allows a user to share with others the published work via emails, for instance, to invite potential beneficiaries for acknowledgement, a comment section displaying existent comments of the work 580, and a form with a Comment button 590 which allows a user to write comment for the published philanthropic work.

FIG. 6 depicts an interface that enables a beneficiary user to verify contribution and reward points to a plural of benefactors and potential indirect benefactors according to an exemplary embodiment. The interface 600 may be displayed on a user's device after a user clicking the Acknowledge button 560 in interface 500 to reward benefactors of a published philanthropic work, or be prompted right after an organizer submitting a philanthropic work finished with participation of volunteers. In this example interface 600, the beneficiary user 605 is presented with the title of a philanthropic work 610, which is a link to the published philanthropic work as depicted in interface 500, and a form with a Transfer EP button 690 which allows the user to acknowledge the benefactors of the philanthropic work, including the organizer and volunteers, by transferring rewarding points to them. The form may display the username of a benefactor of the philanthropic work as shown in Receiver column 620, the total amount of money or time that the benefactor has contributed in the philanthropic work as shown in Work contribution column 630, the unit of the philanthropic work as shown in Work unit column 640, the reference amount of rewarding points to the benefactor determined by the system as shown in Rewarding amount column 650, the unit of rewarding point as shown in Rewarding unit column 660, a brief description of the transaction generated by the system as shown in Description column 670, and a Transferred column 680 which will display a past time if the beneficiary user has rewarded the benefactor for this philanthropic work before. The beneficiary user can verify and override the default amounts displayed in the Work contribution column 630 and the Rewarding amount column 650 to input other amounts before clicking button 690 to confirm the transferring of rewarding points to each of the receivers. For example, the user may input a rewarding amount greater (or less) than the reference rewarding amount if it thinks that a benefactor did the work very well (or not well) hence deserves more (or less) rewards, and may input a 0 if it has rewarded a benefactor for this philanthropic work before. The user may also change the amount of work contribution based on what it has actually benefited from a benefactor's work, which could be 0 too. The interface 600 is meant to be illustrative only, as a variety of other formats or information are possible. For example, the Work contribution column 630 may not be included in an embodiment.

FIG. 7 depicts an interface displaying a profile of a user which comprises the user's rewarding accounts summary information, philanthropic work related activities and a donation section, according to an exemplary embodiment. The interface 700 may be displayed on a user's device after a user clicking a profile link of a user which is a username in green, such as 532 shown in interface 500. This example user profile interface 700, which is public to other users, displays username 710, user headline 720, rewarding accounts' balances and summary information section 730, a Follow button 740 which allows other users to follow the user, user basic information 750, user summary 760, user interested causes 770, list of user's philanthropic work related activities 780 of which each activity includes a brief activity description and a link to its related philanthropic work such as the one depicted in interface 500, and a donation section 790 which allows other users to donate money to the user with a form and an Add to Giving Cart button 795. The rewarding accounts' balances and summary information section 730 may include the account type 731, account balance 732, account unit 733, and summary information 734 about rewarding accounts and transactions of the user and its total number of direct or indirect benefactors and beneficiaries. Specifically in this example interface 700, the summary information 734 displays that the user has contributed 37.52 time points and 4.51 monetary points to its 3 direct benefactors as shown in 735, that 32.41 time points and 27.03 monetary points have been contributed to the user by its 3 direct beneficiaries as shown in 736, and that 0.96 time points and 1.13 monetary points have been distributed to the user by its 6 second degree beneficiaries as shown in 737. Depending on whether the user is viewing the profile of itself, more or less functions and information may be included in the interface 700. For example, if the user is viewing its own profile, it is allowed to edit some information and preferences but not allowed to follow itself, and more information regarding its rewarding accounts, such as credit limits, may be displayed. And depending on the user's user type, subscription and verification status and preference, donation section and the Add to Giving Cart button 790 may or may not be included in the interface 700. The interface 700 is meant to be illustrative only, as a variety of other information, formats or arrangement are possible in other embodiments. For example, in some embodiments, in addition to donation amount and anonymity, other fields, such as message from donor, may be included in the form in the donation section 790. And the donation section 790 may be displayed in other interfaces of the system where users are listed or sorted, for instance, interfaces 800 and 1000.

FIG. 8 depicts an interface displaying a following dashboard of a user which comprises rewarding accounts summary information and philanthropic work related activities of the user's benefactors, beneficiaries, and other users followed by the user, according to an exemplary embodiment. The interface 800 may be displayed on a user's device after a user logging in, or after a user clicking the People and Organizations button 805 on a navigation bar, scrolling down and selecting Your Following Dashboard. This example following dashboard interface 800 displays the user's benefactors, their rewarding accounts balances and summary information related to the user in section 810, the user's beneficiaries, their rewarding accounts balances and summary information related to the user in section 820, other users that the user is following and their rewarding accounts balances and summary information in section 830, and the philanthropic work related activities of the user's benefactors and beneficiaries, or of those that the user is following, in section 840. The section 810 may include each benefactor's username 812, accounts balances 814, and total amount of rewarding points that the user has contributed to the benefactor 816. The section 820 may include each beneficiary's username 822, accounts balances 824, and total amount of rewarding points that the beneficiary has directly distributed to the user 826, and total amount of rewarding points that has been distributed to the user through the beneficiary 828. The section 830 may include username of each of those that the user is following 832, their accounts balances 835 and accounts summary information based on all their direct beneficiaries 836 and based on all their indirect beneficiaries 837. The activities section 840 may show usernames of the users who conduct the activities, brief description of the activities and the links to the related philanthropic works such as the one depicted in interface 500. The usernames in the interface 800 may be the users' profile links that lead to their profiles as depicted in interface 700. Specifically in this example interface 800, the summary information 816 shows that the user has transferred 5.40 monetary points and 0 time points to its direct benefactor with username shown in 812, the summary information 826 shows that 0 monetary points and 4.75 time points have been transferred to the user by its beneficiary with username shown in 822, and the summary information 828 shows that 0.26 monetary points and 0.06 time points have been indirectly distributed to the user through its beneficiary with username shown in 822. The summary information 835 shows that the user, with username shown in 832, whom the logged in user is following, has transferred 9.02 monetary points and 14.70 time points to its 3 direct benefactors, the summary information 836 shows that 14.42 monetary points and 3.62 time points have been transferred to the user with username shown in 832 by its 3 direct beneficiaries, and the summary information 837 shows that 1.11 monetary points and 1.13 time points have been distributed to the user with username shown in 832 by its 6 second degree beneficiaries. The interface 800 is meant to be illustrative only, as a variety of other information, formats or arrangement are possible. For example, other embodiments may exhibit the benefactor or beneficiary users in graphs, and may include other summary information based on rewarding accounts, or based on relationships of higher degree levels.

FIG. 9A depicts an interface displaying basic information of a user's rewarding accounts according to an exemplary embodiment. The interface 900 may be displayed on a user's device after a user logging in and clicking the Accounts and Profile button 901 on a navigation bar and selecting Your EP Accounts. This example interface 900 displays the basic information of rewarding accounts the user owns, which includes an account that contains rewarding points measured in monetary unit, and an account that contains rewarding points measured in time unit. The basic information of a rewarding account may include account name 921, account balance 922, account unit 923, credit limit of account 924, and a link to the transaction details of the account 925. Depending on how the system has initialized the rewarding accounts of a user, instead of assigning a credit limit, an amount of rewarding points may be added directly to the user's account and highlighted in other embodiments.

FIG. 9B depicts an interface displaying transaction details of a user's rewarding account according to an exemplary embodiment. The interface 950 may be displayed on a user's device after a user clicking on the link 925 in interface 900. This example interface 950 may display the rewarding account name 951, a search form 952 with a Search button 953 which allow the user to search the rewarding account's transaction details based on criteria such as transaction time and title of related philanthropic work, and the resulted transaction detail list from the search 954. The transaction list 954 lists transaction history of a rewarding accounts of the user, which may include transaction time 955, transaction description 956, transaction amount 957, and title of the philanthropic work related to the transaction 958 which is link to a public or private philanthropic work as depicted in interface 500. The transaction description 956 may contain information of the paying user, target receiver, and any indirect receivers involved, if the transaction, for instance, is for distributing a portion of the rewarding points to the user as a previous benefactor of a direct target benefactor. The interface 950 is meant to be illustrative only, as a variety of other formats of transaction description, search criteria, widgets or transaction information are possible. For example, the username of direct or indirect benefactors and beneficiaries, or other information of the philanthropic work related to the transaction may be included as search criteria in other embodiments.

Figure 10:
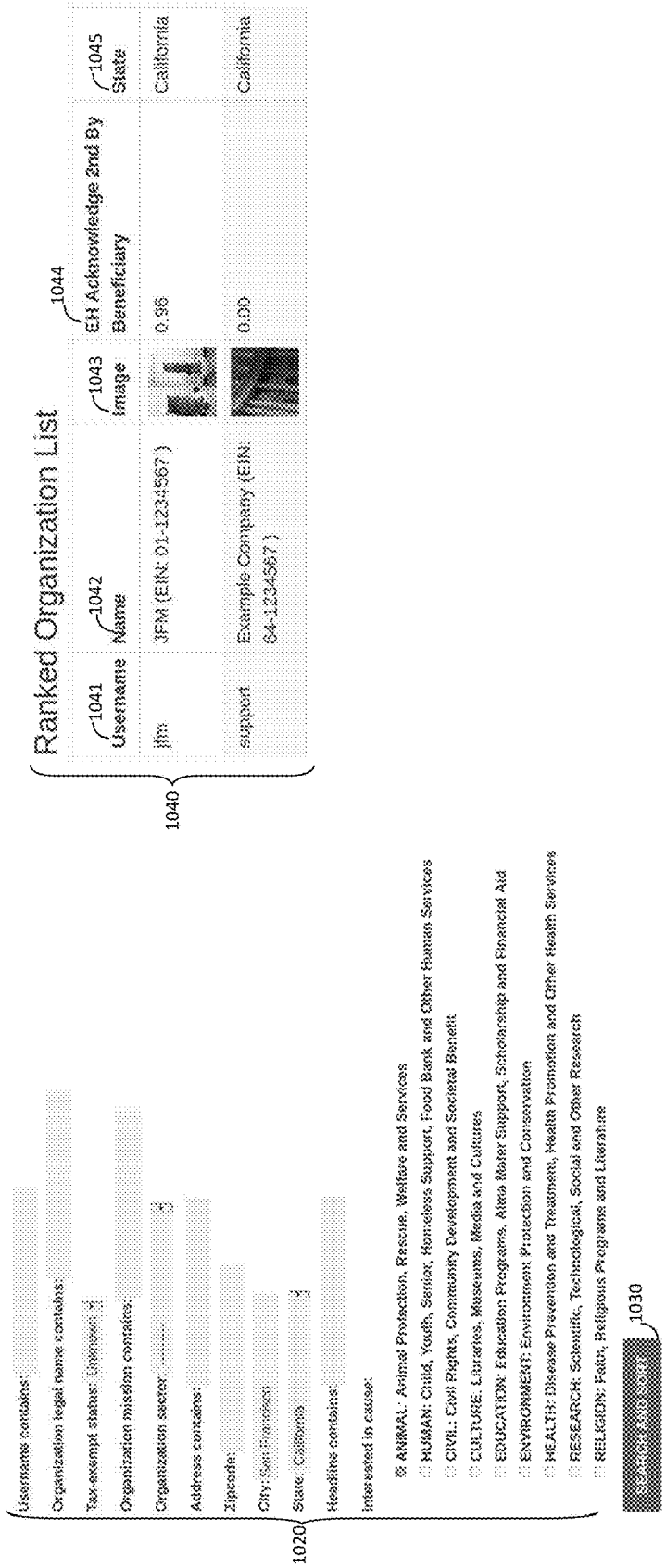
FIG. 10 depicts an interface that enables a user to search other users and sort them based on summary information of their rewarding accounts, according to an exemplary embodiment.

FIG. 10 depicts an interface that enables a user to search and sort users based on summary information of their rewarding accounts, according to an exemplary embodiment. The interface 1000 may be displayed on a user's device after a user clicking the People and Organizations button 1005 on a navigation bar, scrolling down and selecting corresponding summary information to be sorted on. The interface 1000 may display a search form 1020, a Search and Sort button 1030, and a resulted user list 1040 from the search and sort. The search form 1020 may include search criteria such as username, name, location, user's profile headline and interested causes, etc. The resulted user list 1040 may include the ranked user's username 1041 which is a link to the user's profile depicted in interface 700, name 1042, profile image 1043, rewarding account summary information 1044 that is sorted on, and location 1045. Depending on whether the user is searching for people or organizations, different search criteria may be included in the search form 1020, and different result information may be shown in the resulted user list 1040. For example, if the user is searching and sorting organizations, organization's legal name, mission, sector, and tax-exempt status may be included as search criteria, and the name 1042 may display an organization's EIN in addition to its legal name. Specifically in this example interface 1000, organizations that are interested in certain philanthropic cause are searched and ranked on a rewarding account summary information 1010, which is the total amount of time rewarding points that has been distributed to an organization through its beneficiaries when others acknowledge them. The interface 1000 is meant to be illustrative only, as a variety of other summary information to be sorted on, such as the balance of a user's rewarding account, the total amount of rewarding points that a user has transferred to acknowledge its benefactors, the total amount of rewarding points that a user's beneficiaries have transferred to acknowledge it, etc., other formats of search, sort and list layouts or arrangements, and other search criteria, widgets or result information are possible. For example, some other embodiments may display the specific ranking number of a user, or mark a user with tier or level labels or badges.

FIG. 11 depicts an interface displaying a management dashboard with relevant options automatically determined by the system that enables a philanthropic work requester to coordinate with applicants to request slots, according to an exemplary embodiment. The interface 1100 may be displayed to a user on the user's device, right after the user submits a philanthropic work request, reviews and edits the request for any modifications, and decides to publish the request, or after the requester searches it out from all the requests submitted by the requester by clicking the Volunteering button 1105 on a navigation bar and selecting Post Volunteer Need. This example interface 1100 displays descriptive information of the philanthropic work request, such as request title 1110, type 1111, philanthropic cause related to the request 1112, description of the request 1113, instruction file downloadable for future confirmed volunteer applicants 1114, major work role requested 1115, requester username 1116, volunteer time and location of the request 1117, publish time and author of the request 1118, dashboard 1120 which allows the requester to manage coordination and communication for the request at the time slot level in one place, a Share button 1130 which allows a user to share with others the published request via emails to invite potential volunteer applicants, a Generate Work Post button 1140 which allows the requester to generate philanthropic work submission based on this request, and a comment section 1150 which displays existent comments and allows a user to comment on the request, similar to 580 and 590 depicted in interface 500. Dashboard 1120 may include a list of time slot(/s) generated by the system, their starting time 1121, ending time 1122, number of available spots 1123, volunteer applicants 1124 which is a list of volunteer applicants who have applied to the work request, with username links to their user profiles. Depending on the current situation and stage of management process, dashboard 1120 may or may not display for each time slot a Cancel button 1125 which allows the requester to cancel the time slot if it has not been applied by anybody, a Confirm button 1126 which allows the requester to confirm all or some of the unconfirmed volunteer applicants to the time slot and send emails to them, confirmed applicants 1127 which is a list of volunteer applicants to the time slot who have been confirmed by the requester with username links leading to their user profiles, and an Send email button 1128 which allows the requester to send emails to all or some of the confirmed applicants to the time slot. Only relevant buttons, lists and links are presented for corresponding time slots when the system determines certain options are available and certain actions from the requester can be made based on current coordination stage and situation of request and applications. The interface 1100 is meant to be illustrative only, as a variety of other formats of dashboard or communication means, default conditions or descriptive information of the request are possible.

FIG. 12 depicts an interface that enables a philanthropic work requester to communicate with relevant applicants automatically determined by the system according to an exemplary embodiment. The interface 1200 may be displayed on a user's device after a philanthropic work requester clicking on the buttons in dashboard 1120 in interface 1100. This example interface 1200 displays communication description 1210 which describes the communication stage and specific philanthropic work request slot that the communication is related to, a list of communication receivers 1220 which may be a widget pre-filled with system determined receivers for the requester to accept or select/unselect from, an email message template with pre-filled requester username 1230, requester email address 1240, and message content 1250, as well as a Send button 1260. Every time when a requester arrives at interface 1200 after clicking the Confirm button 1126 in interface 1100, the default list of receivers 1220 may contain only those new applicants and those who have not been confirmed if the requester confirmed not all of the applicants last time. Specifically in this example interface 1200, the default list 1220 only contains one applicant who has not been confirmed by the requester yet. The requester can also override and make changes to the default message content 1250. The interface 1200 is meant to be illustrative only, as a variety of other communication stages, pre-determined receivers, formats, widgets or content of message templates are possible.

FIG. 13 depicts an interface that enables a user to search and (un/)apply to philanthropic work request slots according to an exemplary embodiment. The interface 1300 may be displayed on a user's device after a user clicking the Volunteering button 1310 on a navigation bar and selecting Search and Apply for Local Volunteer Opportunities. This example interface 1300 displays a request search form with a Search button 1329 and a list of philanthropic work request time slots 1330 which is the result of the search. The request search form may include search criteria such as minimum stay duration 1320, starting time 1321, ending time 1322, requester username 1323, request title 1324, description of the request 1325, location of the request 1326, philanthropic cause related to the request 1327, and the requested work role 1328 which is an auto-complete widget that displays dynamic search options as the user types. The result list of request time slots 1330 may include requester 1331 which is the username of the requester linking to the requester's user profile, starting time 1332, ending time 1333, location 1334, request title 1335 which is also a link leading to the detail page of the philanthropic work request post, number of available spots for applicants 1336, and an apply column displaying an Apply button 1337 which allows the user to apply for the request time slot, or displaying an Unapply button 1338 which allows the user to un-apply for an applied request time slot before the requester confirms the application, or displaying a "Confirmed" mark 1339 if an application is confirmed by the requester. The interface 1300 is meant to be illustrative only, as a variety of other search criteria, limits, result information, formats or widgets are possible. For example, in other embodiments, full or legal name of the requester may be included as search criteria, or a user may be allowed to search and apply for philanthropic work requests that are not local. In some embodiments, a map may be used to show the locations of the resulted requests as well as the user, based on the user's profile address or geo-location information collected from the user's device, and distances may be further calculated for the user's reference.

FIG. 14 depicts an interface that enables a user to search, view and add to calendar its volunteer applications to philanthropic work request slots according to an exemplary embodiment. The interface 1400 may be displayed on a user's device after a user clicking the Volunteering button 1410 on a navigation bar, scrolling down and selecting Your Volunteer Applications. The interface 1400 may display a search form 1420, a Search button 1429, a list of applications 1430 from the search, and a "Send Confirmed Slots to My Calendar" button 1440. The search form 1420 may include search criteria such as time of the applied request slot, username of the requester, location of the request, title of the request, whether the request is been cancelled by the requester, etc. The resulted application list 1430 may include the starting and ending time of the applied request 1431 and 1432, username of the requester 1433, location of the request 1434, title of the request 1435 which is also a link to the philanthropic work request post, a confirm column 1436 displaying an "Confirmed" mark if an application is confirmed by the requester, and a cancel column 1437 displaying an "Cancelled" mark if a request is cancelled by the requester. By default, if no starting time is given when searching, only those request slots that have not started yet are displayed. The "Send Confirmed Slots to My Calendar" button 1440 allows a user to send system generated calendar file of all the active applied request time slots via email to be imported to the user's personal calendar such as iCalendar, Outlook Calendar, or Google Calendar. The interface 1400 is meant to be illustrative only, as a variety of other search criteria, result information, default conditions, widgets or calendar importing ways are possible. For example, in some embodiments, system generated calendar file of a user's request time slots can be imported to its personal calendar via browser extensions.

FIG. 15 depicts an interface displaying an automatically generated philanthropic work submission based on a finished philanthropic work request, according to an exemplary embodiment. The interface 1500 may be displayed on a user's device after a request user clicking the Generate Work Post button 1140 in interface 1100. The interface 1500 may include a form with a Submit button 1580 for submitting philanthropic work, which is automatically filled with information based on a finished philanthropic work request or any of its finished time slots. Some information of the form can be edited and overridden by user's input. This example interface 1500 displays philanthropic work title 1505, publish preference of the work submission 1510, work time 1515, work location 1520, philanthropic causes related to the work 1525, work description 1530, evidence of the work 1535 such as image and file, work type 1540, work role 1545, benefactor of the work 1550, work unit 1555, benefactor's contribution 1560, and participated volunteers section 1570. The participated volunteers section 1570 allows the user to edit actual volunteers for each of the request time slots, and includes each time slot's starting time 1572, ending time 1574, list of confirmed volunteer applicants 1576 which is a widget pre-filled with usernames of confirmed applicants for the request user to accept or select/unselect from in case some of them did not show up, and an input field 1578 for the request user to add usernames of volunteers who actually volunteered for the time slot but are not included in the confirmed volunteer applicants list 1576. Specifically in this example interface 1500, the requester user is adding a participated volunteer who were not confirmed into field 1578. The interface 1500 is meant to be illustrative only, as a variety of other information, fields, pre-filling and overriding conditions, arrangements, formats or widgets are possible.

While the embodiments have been described within the framework of philanthropic endeavors, it will be appreciated that modifications and variations may be made by a person of skill in the art without departing the spirit and scope of the invention. For instance, the method and system may be realized as a game, or be used in other areas or businesses. Other architectures, modules, components or implementations may be realized. The steps of the method and system may be executed in different orders than that described in the specification or that depicted in the flow charts of drawings. Some of the modules, functions or features may be provided by a separate application or platform.

What is claimed is:

1. A computer-implemented method comprising:
receiving a request user's submission of a philanthropic work request comprising: request title, type, description, related cause, role, skills needed, instructions, starting time, ending time, minimum time duration an applicant needs to work for, estimated number of applicants needed for the said durations, location, whether the request is repeating, and repeating rules;
generating, automatically by computer, one or more request time slots based on the submitted philanthropic work request;
enabling applicant users to search philanthropic work requests and time slots based on one or more criteria comprising: requester, request title, type, description, related cause, role, skills needed, starting time, ending time, minimum time duration an applicant needs to work for, and location, and displaying matched available request time slots for applying;
enabling the request user to coordinate and communicate with applicant users to the one or more request time slots of the philanthropic work request by:
dynamically determining relevant contents, options and graphical user interface elements that simplify and automate operations based on current situation and communication stage; and
providing a management dashboard with the dynamically determined relevant contents, options and graphical user interface element, comprising:
controlling whether and what dynamic contents, options and graphical user interface elements to be displayed according to relevance, availability, necessity and executability of corresponding operations for each request time slot based on current situation and communication stage;
enabling the request user to cancel a request time slot before confirming any applicant user by one click of a dynamically displayed graphical user interface element;
enabling the request user to confirm all or some of applicant users to a request time slot at any time by one click to accept, or selection from, a dynamically displayed graphical user interface element comprising a list of automatically determined options associated with current newly unconfirmed applicant users;
enabling the request user to send batch or tailored messages to all or some of applicant users to a request time slot at any time by one click to accept, or selection from, a dynamically displayed graphical user interface element comprising a list of automatically determined options associated with applicant users relevant to current situation and communication stage; and
enabling the request user to make use or change of dynamically presented message templates with automatically determined contents that are relevant to current situation and communication stage; and
generating, automatically by computer, posts of philanthropic work based on finished philanthropic work requests and time slots.

2. The method of claim 1, wherein generating, automatically by computer, posts of philanthropic work based on finished philanthropic work requests and time slots comprises:
receiving a request from a user to generate a submission post of a finished philanthropic work based on a published philanthropic work request;
determining, automatically by computer, if any new request time slot has passed since last time a philanthropic work post was generated based on the published philanthropic work request;
upon determining that no new request time slot has passed since last time a philanthropic work post was generated based on the published philanthropic work request, rejecting the posting request and notifying the user to wait until at least a new request time slot has finished; and
upon determining that at least one or more new request time slots have passed since last time a philanthropic work post was generated based on the published philanthropic work request, presenting to the request user, based on the newly passed one or more request time slots, dynamically generated philanthropic work post information for reviewing and editing;
wherein at least one of the above two determining conditions must occur.

3. The method of claim 2, wherein upon determining that at least one or more new request time slots have passed since last time a philanthropic work post was generated based on the published philanthropic work request, presenting to the request user, based on the newly passed one or more request time slots, dynamically generated philanthropic work post information for reviewing and editing comprises:

enabling the request user to input actual participated users to the one or more newly passed request time slots by one click to accept, selection from, or making changes to dynamically displayed graphical user interface elements comprising lists of automatically determined options associated with confirmed applicants to corresponding request time slots;

receiving input by the request user comprising evidence of finished philanthropic work; and determining, automatically by computer, amounts of contribution by each of one or more contributors to the finished philanthropic work.

4. The method of claim 1, further comprising:

enabling the request user to preview, roll back to edit, and cancel a submitted philanthropic work request before publishing the request;

enabling the request user to invite others to apply to a published philanthropic work request; and enabling the request user to search and view all of the user's published philanthropic requests.

5. The method of claim 1, further comprising:

enabling a user to search, view, comment on, and share posting with others a published philanthropic work request- or a published philanthropic work post; and enabling a user to reward one of more of contributors of a finished philanthropic work at least based on referenced amounts of rewards automatically determined by computer.

6. The method of claim 1, further comprising:

enabling an applicant user to search and view his or her applied philanthropic work requests and time slots, and to add all or the searched request time slots which have been confirmed by request users to personal calendar by one click.

7. The method of claim 1, further comprising:

enabling an applicant user to apply, and un-apply to a request time slot before being confirmed by the request user, by one click of a dynamically displayed graphical user interface element.

8. The method of claim 1, further comprising:

determining, automatically by computer, reference amounts of rewards to be offered by request users as rewarding bids or to be requested by applicant users as rewarding asks for a philanthropic work request and time slot; and matching, automatically by computer, applicant users and philanthropic work requests and time slots at least based on rewarding bids and rewarding asks.

9. The method of claim 1, further comprising:

enabling work request users to set rewarding bids;

enabling applicant users to search philanthropic work requests and time slots at least based on rewarding bids; and enabling applicant users to be automatically matched to philanthropic work requests and time slots at least based on rewarding bids.

10. The method of claim 1, further comprising:

enabling applicant users to set rewarding asks;

enabling request users to search applicant users at least based on rewarding asks; and enabling philanthropic work requests and time slots to be automatically matched to applicant users at least based on rewarding asks.

11. A system comprising:

one or more servers having at least a computing processor and memory comprising computer programs and instructions;

one or more databases, communicatively coupled to the one or more servers;

and when the computer programs and instructions are executed by the computing processor, the one or more servers are configured to perform one or more actions comprising:

receiving a request user's submission of a philanthropic work request comprising: request title, type, description, related cause, role, skills-needed, instructions, starting time, ending time, minimum time duration an applicant needs to work for, estimated number of applicants needed for the said durations, location, whether the request is repeating, and repeating rules;

generating, automatically by computer, one or more request time slots based on the submitted philanthropic work request;

enabling applicant users to search philanthropic work requests and time slots based on one or more criteria comprising: requester, request title, type, description, related cause, role, skills needed, starting time, ending time, minimum time duration an applicant needs to work for, and location, and displaying matched available request time slots for applying;

enabling the request user to coordinate and communicate with applicant users to the one or more request time slots of the philanthropic work request by:

dynamically determining relevant contents, options and graphical user interface elements that simplify and automate operations based on current situation and communication stage; and providing a management dashboard with the dynamically determined relevant contents, options and graphical user interface element, comprising:

controlling whether and what dynamic contents, options and graphical user interface elements to be displayed according to relevance, availability, necessity and executability of corresponding operations for each request time slot based on current situation and communication stage;

enabling the request user to cancel a request time slot before confirming any applicant user by one click of a dynamically displayed graphical user interface element;

enabling the request user to confirm all or some of applicant users to a request time slot at any time by one click to accept, or selection from, a dynamically displayed graphical user interface element comprising a list of automatically determined options associated with current newly unconfirmed applicant users;

enabling the request user to send batch or tailored messages to all or some of applicant users to a request time slot at any time by one click to accept, or selection from, a dynamically displayed graphical user interface element comprising a list of automatically determined options associated with applicant users relevant to current situation and communication stage; and enabling the request user to make use or change of dynamically presented message templates with automatically determined contents that are relevant to current situation and communication stage; and generating, automatically by computer, posts of philanthropic work based on finished philanthropic work requests and time slots.

12. The system of claim 11, wherein generating, automatically by computer, posts of philanthropic work based on finished philanthropic work requests and time slots comprises:
- receiving a request from a user to generate a post of a finished philanthropic work based on a published philanthropic work request;
- determining, automatically by computer, if any new request time slot has passed since last time a philanthropic work submission was generated based on the published philanthropic work request;
- upon determining that no new request time slot has passed since last time a philanthropic work post was generated based on the published philanthropic work request, rejecting the posting request and notifying the user to wait until at least a new request time slot has finished; and
- upon determining that at least one or more new request time slots have passed since last time a philanthropic work post was generated based on the published philanthropic work request, presenting to the request user, based on the newly passed one or more request time slots, dynamically generated philanthropic work information for reviewing and editing;
- wherein at least one of the above two determining conditions must occur.

13. The system of claim 12, wherein upon determining that at least one or more new request time slots have passed since last time a philanthropic work post was generated based on the published philanthropic work request, presenting to the request user, based on the newly passed one or more request time slots, dynamically generated philanthropic work information for reviewing and editing comprises:
- enabling the request user to input actual participated users to the one or more newly passed request time slots by one click to accept, selection from, or making changes to dynamically displayed graphical user interface elements comprising lists of automatically determined options associated with confirmed applicants to corresponding request time slots;
- receiving input by the request user comprising evidence of finished philanthropic work; and
- determining, automatically by computer, amounts of contribution by each of one or more contributors to the finished philanthropic work.

14. The system of claim 11, wherein the one or more actions further comprise:
- enabling the request user to preview, roll back to edit, and cancel a submitted philanthropic work request before publishing the request;
- enabling the request user to invite others to apply to a published philanthropic work request; and
- enabling the request user to search and view all of the user's published philanthropic requests.

15. The system of claim 11, wherein the one or more actions further comprise:
- enabling a user to search, view, comment on, and share posting with others a published philanthropic work request or a published philanthropic work post; and
- enabling a user to reward one of more of contributors of a finished philanthropic work at least based on referenced amounts of rewards automatically determined by computer.

16. The system of claim 11, wherein the one or more actions further comprise:
- enabling an applicant user to search and view his or her applied philanthropic work requests and time slots, and to add all or the searched request time slots which have been confirmed by request users to personal calendar by one click.

17. The system of claim 11, wherein the one or more actions further comprise:
- enabling an applicant user to apply, and un-apply to a request time slot before being confirmed by the request user, by one click of a dynamically displayed graphical user interface element.

18. The system of claim 11, wherein the one or more actions further comprise:
- determining, automatically by computer, reference amounts of rewards to be offered by request users as rewarding bids or to be requested by applicant users as rewarding asks for a philanthropic work request and time slot, and
- matching, automatically by computer, applicant users and philanthropic work requests and time slots at least based on rewarding bids and rewarding asks.

19. The system of claim 11, wherein the one or more actions further comprise:
- enabling work request users to set rewarding bids;
- enabling applicant users to search philanthropic work requests and time slots at least based on rewarding bids; and
- enabling applicant users to be automatically matched to philanthropic work requests and time slots at least based on rewarding bids.

20. The system of claim 11, wherein the one or more actions further comprise:
- enabling applicant users to set rewarding asks;
- enabling request users to search applicant users at least based on rewarding asks; and
- enabling philanthropic work requests and time slots to be automatically matched to applicant users at least based on rewarding asks.

* * * * *